United States Patent
Paillet et al.

(10) Patent No.: US 7,270,053 B2
(45) Date of Patent: Sep. 18, 2007

(54) BINDING DEVICE

(75) Inventors: Frédéric Paillet, Gray (FR); Pascal Gresset, Courvieres (FR); Raymond Uros, Gray (FR); Jean Viaud, Gray (FR)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 11/415,635

(22) Filed: May 2, 2006

(65) Prior Publication Data

US 2006/0254436 A1 Nov. 16, 2006

(30) Foreign Application Priority Data

May 13, 2005 (DE) .................. 10 2005 022 350

(51) Int. Cl.
*B65B 13/02* (2006.01)
(52) U.S. Cl. ............................ 100/5; 100/13
(58) Field of Classification Search ............ 100/1, 100/2, 3, 5, 6, 8, 13, 15, 88, 89; 56/341, 56/343
See application file for complete search history.

(56) References Cited

U.S. PATENT DOCUMENTS

| 4,796,524 A | * | 1/1989 | Renaud .................. 100/3 |
| 5,012,733 A | | 5/1991 | Staudinger |

FOREIGN PATENT DOCUMENTS

| DE | 299 05 765 | 3/1999 |
| EP | 0 815 721 A1 | 5/1997 |
| EP | 1 336 334 | 2/2002 |

OTHER PUBLICATIONS

European Search Report, Jul. 27, 2006, 5 Pages.

* cited by examiner

*Primary Examiner*—Jimmy Nguyen

(57) ABSTRACT

A binding device for use on a cylindrical baling press that includes two binder dispensing mechanisms guided in a frame and which move transverse to a baling chamber of the baling press. Each binder dispensing mechanism further includes a binder advancing device having a drive wheel in rolling engagement with a drive mechanism configured to cause the drive wheel to rotate. The drive mechanism of the binder advancing mechanism is configured separately from a drive device of the binder dispensing mechanisms. Binding material is dispensed by the movement of the binder dispensing mechanisms and/or the movement of the drive device.

4 Claims, 2 Drawing Sheets

BINDING DEVICE

BACKGROUND

1. Field of the Invention

The invention relates to a cylindrical baling press used in agricultural machinery. More specifically, the invention relates to a binding device for wrapping bales of crop formed in the cylindrical baling press in a binding material.

2. Description of Related Art

European Patent 217,714 discloses a binding device having two binder dispensing mechanisms fixed to a length of chain passed around two deflecting wheels. Cog wheels rollingly engage the chain, and advance a binder material between said wheels whereby the binding material is fed to a baling chamber.

The prior art is configured with a single drive mechanism for the binder dispensing mechanism and the binder advance mechanism. In view of the above, it is apparent there exists a need for an improved binder dispensing and advance mechanism.

SUMMARY

In satisfying the above need, the present invention provides a separate drive mechanism for advancing binding material and controlling the movement of the dispensing mechanism. Separate control is desirable since the speed, force, and the like required by the two functions often differ. If a problem arises from, for example, fragments or foreign matter entering the mechanism, it will not adversely affect both drive mechanisms, and it allows such foreign matter to be eliminated more easily. In addition, it is easier to remove the binder dispensing mechanism from the overall binding device for maintenance purposes, as compared to when the dispensing mechanism is also coupled to a drive mechanism for the binder advancer. Instead of a single binder dispensing mechanism, a plurality of dispensing mechanisms (for example, two or three) may also be provided. The binder material may be twine comprised of sisal, plastic, or paper or may comprise strip material comprised of plastic or the like.

The binder advancers are preferably profiled or elastic wheels which rotate in opposite directions and advance the binder material which is held between them by compressive force and friction. Their rotational movement is derived in a simple manner from the translational movement of the binder dispensing mechanism produced by the drive device since each binder advancer has a wheel engaged by a chain, toothed rack, frictional rod, or the like. Freewheeling clutches are provided which allow the binding material to pass if it is being more rapidly withdrawn by a cylindrical bale faster than can be delivered by the binder advancer.

Control of the binder advancer may be provided, and the chain or toothed rack may be omitted, if one of the wheels in the binder advancer includes a motor. Essentially only one wheel per binder advancer is needed, for example, the wheel may advance the binding material while pressing it against a wall.

It may be advantageous for the binder advancer to be able to hold the binding material strongly, to increase the tension in the binding material after it has been taken up by a rotating cylindrical bale. On the other hand, at the beginning of the binding process, it may be advantageous if a means of disengaging the drive mechanism, for example, a freewheeling clutch, is provided to disengage the binder advancer after the binding process has begun.

If the drive device is controllable by means of a sensor, for example, a switch, the distance of the binding material from the end face of a cylindrical bale can be adjusted to avoid situations where the outermost loop(s) of the binding material slide off of the end of the pressed cylindrical bale.

It is possible to operate a cutting device independently from the binding device. However, it is advantageous if cutting can occur in cooperation with the movement of the dispensing mechanism. This allows the movement of the dispensing mechanism to be used to cut the binding material. Alternatively, the cutting device may be provided on the binder dispensing mechanism itself. In this configuration, the cutting device may cooperate with an opposing cutting element on the frame of the binding device.

The provision of a drive device which comprises a chain guided around two wheels, or the like, and is driven by a motor provides a simple means of connecting and driving the dispensing mechanism. Alternatively, a belt, cable, or similar feature may be substituted for the chain.

An embodiment of the binder advancer wherein the binder advancer is not always mechanically coupled to its drive mechanism makes it possible to keep the binder advancer unaffected by external forces. This allows the binding material to be fed to the baling chamber under greater or lesser tension.

Further objects, features and advantages of this invention will become readily apparent to persons skilled in the art after a review of the following description, with reference to the drawings and claims that are appended to and form a part of this specification.

DETAILED DESCRIPTION

Figure 1:
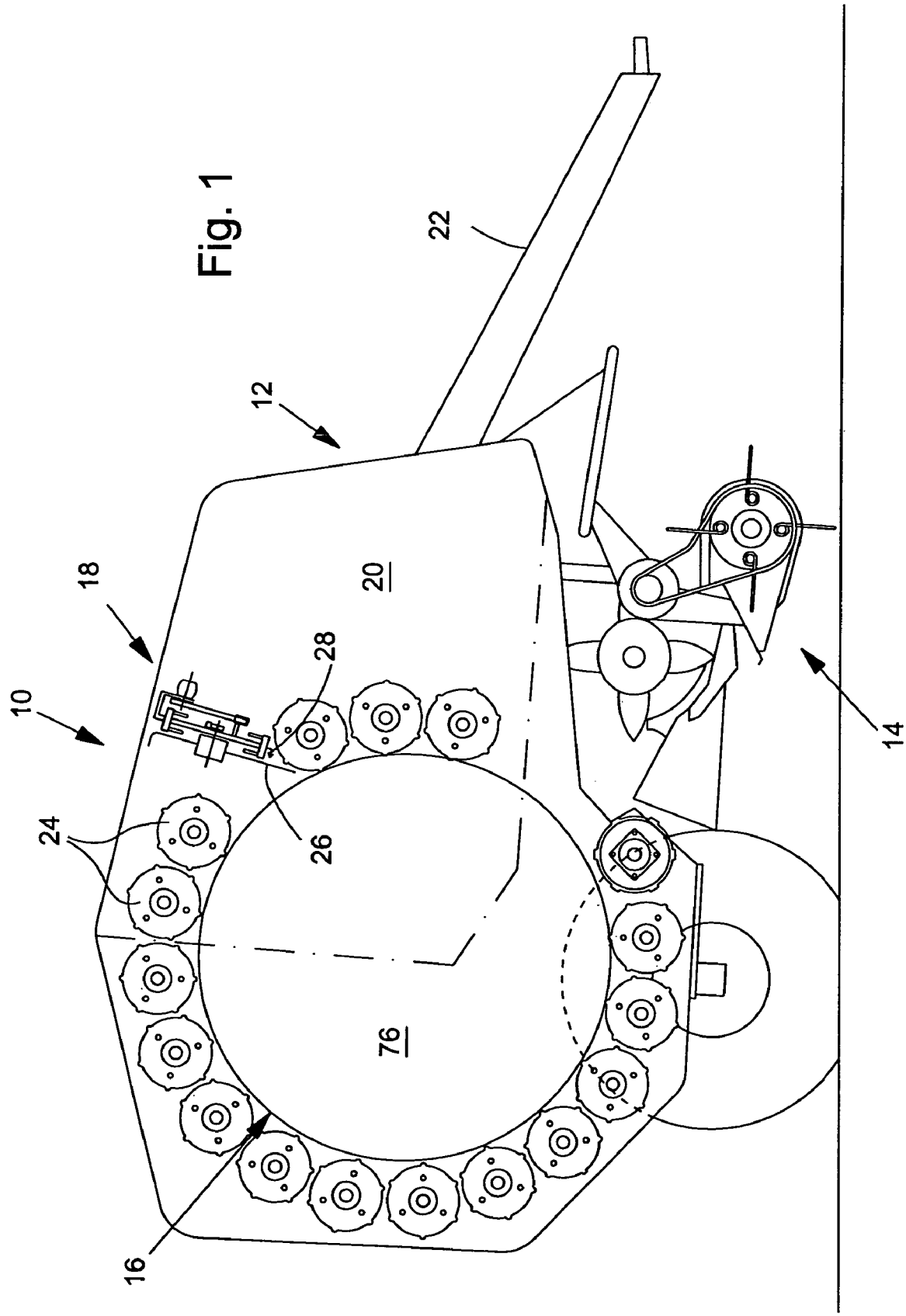
FIG. 1 illustrates a cylindrical baling press in a side view including a binding device according to the principles of the present invention.

A cylindrical baling press is illustrated in FIG. 1 and has a press frame 12, a crop material feed device 14 for feeding crop material into a baling chamber 16, and a binding device 18. The illustrated cylindrical baling press 10 is merely an example of a typical baling press that forms bales of a pressed product, in this case crop material that can be wrapped by a binding material 26. The baling press 10 may be any type employed in agriculture or industry, used to form crop materials, waste materials, paper, fabric, cotton, tobacco, etc. into bales which may be cylindrical in shape. The configuration of the example shown in FIG. 1 includes a baling chamber 16 having fixed dimensions; Alternatively, the cylindrical baling press 10 may include a baling chamber 16 that is adjustable in size. In general, the binding device 18 of the present invention may be employed in any application where it is desired to surround an object with a binding material dispensed from a reel, spool, or roll. It is not limited solely to use with the baling press 10.

Turning to the baling press 10, the press frame 12 is a conventional configuration including a chassis, an axle with wheels, side walls 20, and a tow arm 22. The tow arm 22 extends from the front end of the frame 12 to a towing vehicle (not shown). The crop material feed device 14 shown in FIG. 1, disposed below the tow arm 22, is merely an example of any device whereby materials to be pressed are delivered to the baling chamber 16.

The baling chamber 16 extends between the side walls 20, and, in the example illustrated, is surrounded by a plurality of rollers 24 arrayed in a circle. In an upper, forward region of the circle, an upper gap is provided between the rollers 24 for the binding device 18 and a lower gap is provided for the crop material feed device 14.

The binding device 18 introduces the binding material 26, in the form of twine, nylon filaments, string, or the like, into the baling chamber 16 where the binding material 26 is wound around the pressed crop material. The binding device 18 may be positioned at virtually any point on the cylindrical baling press 10, although the binding device 18 will usually be positioned, for example on the top or back, so as to enable easy access by operating personnel. In the embodiment illustrated, the binding device 18 is located in the forward top region of the press frame 12, above the tow arm 22, and is configured such that the binding material 26 is delivered into the baling chamber 16 through the upper gap between two rolls 24. A cutting device 28 for cutting the binding material 26, which may be any type of appropriate device, is also included in the upper gap. The binding material 26 is stored on and supplied from reels or rolls.

The binding device 18 (FIG. 2) includes a frame 30, dispensing mechanisms 32 for dispensing the binding material 26, advancing means 34 for advancing the binding material 26, a drive device 36, an advancer drive 38, and the cutting device 28.

The frame 30 is composed, for example, of bent and welded sheet metal parts forming a rigid structure which is then mounted on the side walls 20 of the press frame 12. Two guide walls 40 are included in the frame 30, each of which has a profile of, for example, a T-shape or U-shape, to provide a bearing means for sliding or rolling, and serves to guide the dispensing mechanisms 32 transversely to a longitudinal axis of the cylindrical baling press 10 (i.e. horizontally from one side wall 20 to the other). Binder guides 42, usually formed as eyes which are penetrable in the vertical direction, are mounted near the upper guide wall 40. At the inner sides of vertical walls 44, which are coupled to the two guide walls 40, a lower holder 46 and an upper holder 48 are mounted, and extend into the interior space of the frame 30. Near the lower guide wall 40, the cutting device 38 is mounted. The cutting device 28 includes knife edges configured to have a shearing action on the binding material 26 when the binder dispensing mechanisms 32 are at an approximately central position of the frame 30. Each such cutting device 28 is hook-shaped, and catches (engages) the binding material 26 when the binder dispensing mechanisms 32 pass by the cutting device 28.

In the embodiment illustrated, two dispensing mechanisms 32 are provided, however, other embodiments may include more dispensing mechanisms 32 or fewer, depending on the application. Since each dispensing mechanism 32 has the same structure, only one will be described below. Each dispensing mechanism 32 has a base structure 50 composed of a plate, frame, or similar, which has rollers 52 in its lower and upper regions which movably support the base structure 50 on or in the guide walls 40. In the present embodiment, only rollers 52 for the lower guide wall 40 are shown, but rollers 52 also engage the upper guide wall 40 but have been omitted for clarity. The base structure 50 includes a connector 54, the function of which will be described below. Additional binder guides 56 for the binding material 26 are provided along a vertical line in the middle of the base structure 50. The additional binder guides 56 serve to guide the binding material 26 transversely to the direction of movement of the dispensing mechanism 32 and facilitate the introduction of the binding material 26 into and out of the advancing means 34. The advancing means 34 is positioned between the additional binder guides 56.

Each advancing means 34 includes, for example, two counter-rotating wheels 58, which are in constant mutual rotational engagement by frictional or form-interlocking means. Alternately, the wheels 58 may rotate synchronously by virtue of the binding material 26 running between them. In the example illustrated, the circumferential surfaces of these wheels have teeth or ridges (not shown). The wheels 58 are positioned on one side of the base structure 50 and are supported on a shaft 60 which extends through and is rotatable within the base structure 50. On one of these shafts 60, a drive wheel 62 is also provided. Thus, one of the wheels 58, together with its shaft 60 and the drive wheel 62, forms a rotating unit. The wheel 58, or the drive wheel 62, on the shaft 60 has a freewheeling clutch 64, such that if the binding material 26 is withdrawn more rapidly by a rotating cylindrical bale 76 than the advancing means 34 can advance the binding material 26, the drive linkage between the wheel 58 (or drive wheel 62) and the shaft 60 is interrupted allowing the binding material 26 to be withdrawn more quickly. The freewheeling clutch 64 also goes into effect if the direction of the advancing means 34 is reversed to withdraw the binding material 26 from the baling chamber 16.

The present embodiment of, the drive device 36 includes a motor 66, a drive transmitter 68, wheels 70. The motor 66 may be controlled by a control device (not shown), and typically is a relatively slowly rotating electric motor. The rotational movement of the motor 66 is transmitted by means of a transmission (not shown) and ultimately delivered to a drive wheel 72. The motor 66 is fixed to the lower holder 46 by, for example, screws, rivets, or other fastening means, and its rotational speed may be constant or variable. The drive transmitter 68 is a simple endless chain, but may be, for example, a cable, belt, or the like. The drive transmitter 68 extends over nearly the entire distance between the walls 44, in a plane essentially vertical and transverse to the direction of travel of the cylindrical baling press 10. The drive transmitter 68 is passed over the wheels 70 and the wheel 72, and is connected to the dispensing mechanisms 32 by means of the connectors 54. The wheels 70 are rotatably mounted to the lower holders 46, and rotate around axes which extend transversely to a plane defined by the course of the drive transmitter 68. The wheels 70 and 72 are arranged such that the two lengths of the drive transmitter 68 are generally parallel. The drive device 36 is controlled such that the drive transmitter 68 is moved in one direction until one of the connectors 54 approaches the immediate vicinity of one of the wheels 70 or 72, at which point the direction is reversed.

The advancer drive 38 includes the drive wheel 62 engaging a drive element 74, the drive element 74 being, in the example illustrated, a chain, extending between the vertical walls 44. The drive element 74, rather than being movable, is fixed under tension between the upper holders 48. If necessary, a tensioning device (not shown) may also be included. The drive element 74 is configured as a single section parallel to the upper length of the drive transmitter 68. Instead of a chain, the drive element 74 may be a toothed rack, bar, cable, belt or the like. The advancer drive 38 is configured to provide resistance to the drive wheel 62 which is moved laterally by the drive device 36, causing the drive wheel 62 to rotate. The advancer drive 38 is sufficiently long that two drive wheels 62 can operate simultaneously. However, in some embodiments, two parallel advancer drives 38 may be provided.

In another variant, the advancer drive 38 may be active, rather than passive as described above, and composed of a simple electric motor which causes the drive wheel 62 to rotate, or which replaces the drive wheel 62. In such an embodiment, the motor moves laterally along with the dispensing mechanism 32 and the drive element 74 may be a set of gears to rotate the drive wheel 62, or be omitted entirely. However, in the present embodiment, the advancer drive 38 is passive and the drive wheel 62 is driven as a result of the movement of the dispensing mechanism 32.

Taking into account all of the preceding, the structure and functioning of the binding device 18 is described below. Preferably, the binding device 18 is made of prefabricated components disposed between the lateral walls 20 of the baling press 10 along with the cutting devices 28.

The dispensing mechanisms 32 are essentially identically constructed but are arranged on the two lateral sides of the tension-type drive transmitter 68 in mirror-image fashion and movable with respect to each other. In the mounted state, the wheels 58 are disposed on the outer side, and the drive wheels 62 are disposed on the inner side, toward a midpoint between the vertical walls 44.

Figure 2:
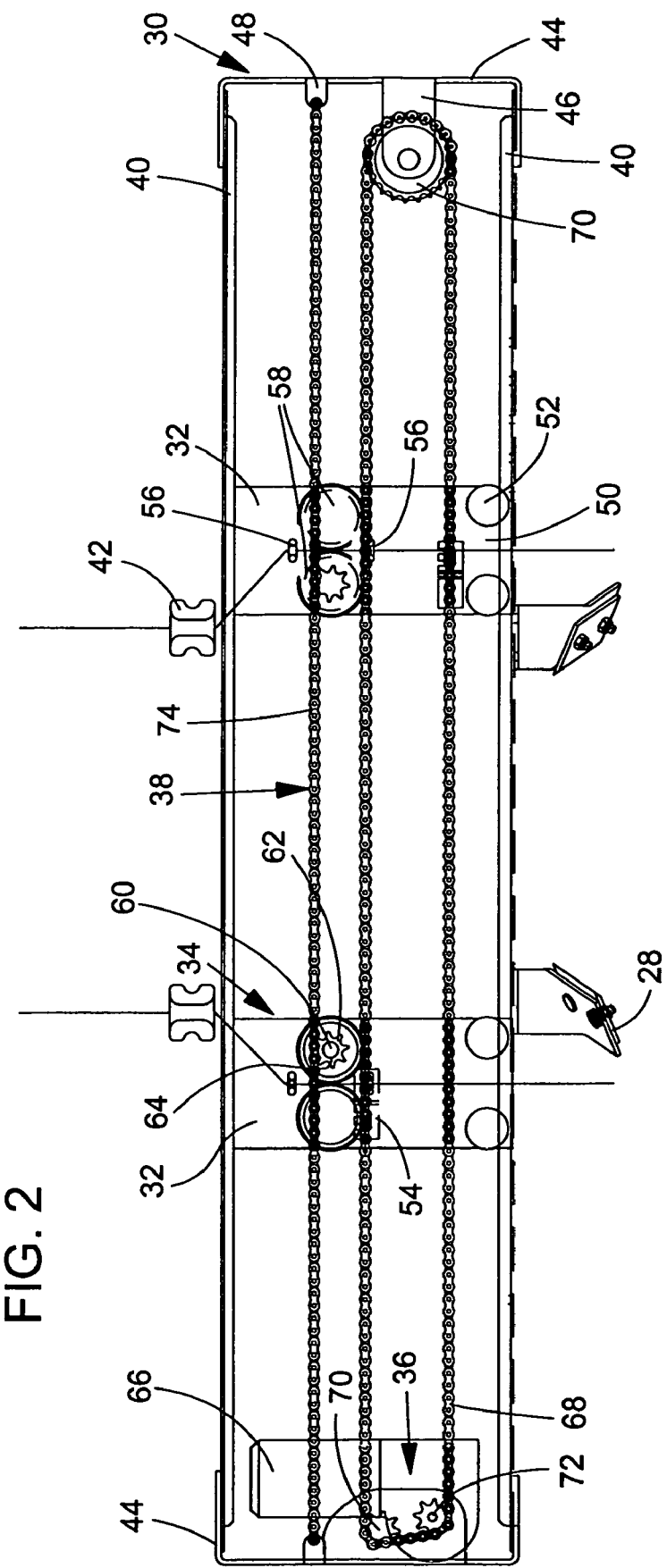
FIG. 2 illustrates a front view of the binding device of the present invention.

The dispensing mechanisms 32 are coupled with the drive transmitter 68 such that the two dispensing mechanisms 32 shown in FIG. 2 move symmetrically outwardly (away from one another) and inwardly (toward one another) with respect to the mid-point between the vertical walls 44. At the end of a binding operation, the dispensing mechanisms 32 preferably come to a stop at said mid-point, where the binding material 26 is cut by the cutting devices 28.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A binding device of a cylindrical baling press comprising:
    a frame having opposite, laterally spaced ends;
    an advancer drive including a straight length of roller chain extending between said straight lenght of roller chain having opposite ends respectively anchored to said opposite ends of said frame;
    at least one dispensing mechanism including a base member mounted to said frame for lateral movement between said opposite ends of said frame along a path of movement extending substantially parallel to said straight length of roller chain;
    a drive device coupled to said frame and said at least one dispensing mechanism for selectively effecting mechanism of said dispensing movement between said opposite ends of said frame;
    a binder advancing device including a pair of counter-rotating wheels mounted to said base member so as to advance binding material extending between said pair of counter-rotating wheels when said wheels are rotated; and
    a drive mechanism including a drive sprocket wheel disposed coaxially with, and joined to, one of said pair of counter-rotating wheels and being meshed with said length of roller chain for driving said binder advancing device when said dispensing mechanism undergoes lateral movement.

2. A binding device according to claim 1, wherein the drive mechanism includes a freewheeling clutch coupled to the drive sprocket wheel.

3. A binding device according to claim 1, further comprising a cutting device fixed to said frame, the cutting device arranged adjacent the path of movement of the dispensing mechanism.

4. A binding device according to claim 1, wherein the drive device includes first and second sprocket wheels respectively mounted to a drive transmitter including a second length of roller chain that is guided around said first and second sprocket wheels; and is coupled to said base member of said at least one dispensing mechanism;
    a motor mounted to one end of said frame; and
    a second drive sprocket wheel being coupled for being driven by said motor and being meshed with said second length of roller chain.

* * * * *